US012326571B2

(12) United States Patent
Kim

(10) Patent No.: US 12,326,571 B2
(45) Date of Patent: Jun. 10, 2025

(54) DEVICE FOR DISPLAYING SIDE VIEW OF VEHICLE AND METHOD FOR DISPLAYING SIDE VIEW USING THE SAME

(71) Applicants: Hyundai Motor Company, Seoul (KR); Kia Corporation, Seoul (KR)

(72) Inventor: Min Han Kim, Seongnam-Si (KR)

(73) Assignees: Hhyundai Motor Company, Seoul (KR); Kia Corporation, Seoul (KR)

( * ) Notice: Subject to any disclaimer, the term of this patent is extended or adjusted under 35 U.S.C. 154(b) by 5 days.

(21) Appl. No.: 18/228,285

(22) Filed: Jul. 31, 2023

(65) Prior Publication Data

US 2024/0160025 A1 May 16, 2024

(30) Foreign Application Priority Data

Nov. 10, 2022 (KR) ........................ 10-2022-0149685

(51) Int. Cl.
*B60K 35/23* (2024.01)
*B60R 1/25* (2022.01)
*G02B 27/01* (2006.01)
*H04N 5/262* (2006.01)
*B60K 35/00* (2006.01)
*B60K 35/60* (2024.01)

(52) U.S. Cl.
CPC ............ *G02B 27/0179* (2013.01); *B60R 1/25* (2022.01); *G02B 27/0103* (2013.01); *H04N 5/2628* (2013.01); *B60K 35/00* (2013.01); *B60K 35/23* (2024.01); *B60K 35/60* (2024.01); *B60K 2360/21* (2024.01); *B60K 2360/29* (2024.01); *B60K 2360/785* (2024.01); *B60R 2300/205* (2013.01); *G02B 2027/0141* (2013.01); *G02B 2027/0183* (2013.01)

(58) Field of Classification Search
CPC ................ G02B 27/01; G02B 27/0101; G02B 2027/014; G02B 2027/0138; G02B 2027/0141; G02B 27/0179; G02B 2027/0183; G02B 2027/0187; B60R 1/26; B60R 11/04; B60R 2001/1253; B60R 1/12; B60R 2300/802; B60R 1/27; B60R 1/28; B60R 2300/105; B60R 2300/8066
USPC .......................................................... 348/40
See application file for complete search history.

(56) References Cited

U.S. PATENT DOCUMENTS

2011/0157667 A1\* 6/2011 Lacoste ................ G03H 1/2249
359/9
2016/0231568 A1 8/2016 Saarikko et al.
(Continued)

OTHER PUBLICATIONS

Jin-Ho Lee et al. "Automotive Augmented Reality 3D Head-up Display Based on Lightfield Rendering with Eye-Tracking" (URL:https://opg.optica.org/oe/fulltext.cfm?url=oe-28-20-29788&id=439841).

*Primary Examiner* — Masum Billah
(74) *Attorney, Agent, or Firm* — Morgan, Lewis & Bockius LLP

(57) ABSTRACT

A device configured for displaying a side view of a vehicle includes a sensor assembly configured for obtaining vehicle speed information of the vehicle and a surrounding region image of the vehicle, a processor that generates a projection image to be displayed to a user based on the surrounding region image, and sets a projection position where the projection image is displayed based on the vehicle speed information, and a head up display for displaying the projection image at the projection position under control of the processor.

18 Claims, 23 Drawing Sheets

(56) References Cited

U.S. PATENT DOCUMENTS

2017/0276948 A1    9/2017  Welch et al.
2020/0152157 A1*  5/2020  Hada ........................ G09G 5/38
2023/0401760 A1* 12/2023  Byoun ................. B60K 35/232
2024/0255289 A1*  8/2024  Bagon ..................... G06T 19/00

* cited by examiner

DEVICE FOR DISPLAYING SIDE VIEW OF VEHICLE AND METHOD FOR DISPLAYING SIDE VIEW USING THE SAME

CROSS-REFERENCE TO RELATED APPLICATION

The present application claims priority to Korean Patent Application No. 10-2022-0149685, filed on Nov. 10, 2022, the entire contents of which is incorporated herein for all purposes by this reference.

BACKGROUND OF THE PRESENT DISCLOSURE

Field of the Present Disclosure

The present disclosure relates to a device for displaying a side view of a vehicle and a method for displaying the side view using the same, and more specifically, to a technology which may be helpful in visibility and traveling stability of the vehicle.

Description of Related Art

Side mirrors are formed on both side surfaces of a vehicle so that a driver may check side-rear regions of the vehicle.

However, there is a blind spot which is not able to be checked via the side mirrors.

Recently, to compensate for limitations of optical mirrors, a technique of capturing a side region of the vehicle with a camera by minimizing a blind spot and displaying the captured image using a side monitor formed at a position of the side mirror has emerged.

The side monitor has a very small focal length, unlike the optical mirror. Therefore, it takes time to adjust a focus of eyes at a moment when a driver's gaze is switched from the front to the side monitor or from the side monitor to the front. Accordingly, not only the driver momentarily feels uncomfortable, but also eye fatigue is increased.

Furthermore, installation of the conventional side monitor for displaying a side view may be complicated because of mechanical characteristics.

Furthermore, because the side monitor is provided inside the vehicle, an arrangement with the conventional optical side mirror changes, such that the driver may feel a sense of difference.

Furthermore, because the conventional side monitor performs only a one-dimensional function of displaying the image, there is a limit in providing wider convenience of view to the driver.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a device configured for displaying a side view of a vehicle and a method for displaying the side view using the same that may reduce a sense of difference in a focal length caused by a side monitor.

Another aspect of the present disclosure provides a device configured for displaying a side view of a vehicle and a method for displaying the side view using the same that may reduce inconvenience caused by installation of a side monitor.

Another aspect of the present disclosure provides a device configured for displaying a side view of a vehicle and a method for displaying the side view using the same that may reduce a sense of difference in a driver's gaze based on an installation position of a side monitor.

Another aspect of the present disclosure provides a device configured for displaying a side view of a vehicle and a method for displaying the side view using the same that may increase eye adaptability even when a driver's focal length varies based on a speed of the vehicle.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a device configured for displaying a side view of a vehicle includes a sensor assembly configured for obtaining vehicle speed information of the vehicle and a surrounding region image of the vehicle, a processor that generates a projection image to be displayed to a user based on the surrounding region image, and sets a projection position where the projection image is displayed based on the vehicle speed information, and a head up display for displaying the projection image at the projection position under control of the processor.

In an exemplary embodiment of the present disclosure, the sensor assembly may include a camera configured for obtaining an image of a side-rear region of the vehicle.

In an exemplary embodiment of the present disclosure, the processor is configured to generate an image box for determining a size of the projection image, and differently set a position where an object is displayed in the generated image box based on a distance of the object detected in the surrounding region image.

In an exemplary embodiment of the present disclosure, the head up display may separate the projection image into a plurality of images using a hologram lens, and display a hologram image based on the separated images.

In an exemplary embodiment of the present disclosure, the processor is configured to determine the projection position within a windshield of the vehicle when a speed of the vehicle is equal to or greater than a threshold speed.

In an exemplary embodiment of the present disclosure, the processor is configured to generate a projection image for an image of a side-rear region in a direction of a passenger seat of the vehicle, and set the projection position to be closer to a side mirror of the vehicle within the windshield in proportion to the speed of the vehicle when the speed of the vehicle is equal to or greater than the threshold speed.

In an exemplary embodiment of the present disclosure, the processor may set a projection distance between both eyes of the user and the projection image to be longer as the speed of the vehicle increases.

In an exemplary embodiment of the present disclosure, the processor is configured to determine the projection position so that a shortest distance between the projection position and a virtual straight line for connecting both eyes of the user and a side mirror of the vehicle to each other is within a threshold distance in response that the speed of the vehicle is lower than the threshold speed.

In an exemplary embodiment of the present disclosure, the head up display may use a hologram lens provided in a fixed region not opened or closed in a side window of the vehicle.

In an exemplary embodiment of the present disclosure, the head up display may include a first display located on a left side mirror of the vehicle and configured for displaying a first projection image, and a second display located on a right side mirror of the vehicle and configured for displaying a second projection image, and the processor may display the projection image so that a projection distance of the first projection image and a projection distance of the second projection image are equal to each other.

According to another aspect of the present disclosure, a method for displaying a side view of a vehicle includes obtaining, by a sensor assembly, vehicle speed information of the vehicle and a surrounding region image of the vehicle, generating, by a processor, a projection image to be displayed to a user based on the surrounding region image, setting, by the processor, a projection position where the projection image is displayed based on the vehicle speed information, and displaying, by the processor, the projection image at the projection position using a head up display.

In an exemplary embodiment of the present disclosure, the obtaining of the surrounding region image of the vehicle may include obtaining an image of a side-rear region of the vehicle.

In an exemplary embodiment of the present disclosure, the generating of the projection image may include generating an image box for determining a size of the projection image, and differently setting a position where an object is displayed in the generated image box based on a distance of the object detected in the surrounding region image.

In an exemplary embodiment of the present disclosure, the displaying of the projection image may include separating the projection image into a plurality of images using a hologram lens, and displaying a hologram image based on the separated images.

In an exemplary embodiment of the present disclosure, the setting of the projection position where the projection image is displayed based on the vehicle speed information may include determining the projection position within a windshield of the vehicle when a speed of the vehicle is equal to or greater than a threshold speed.

In an exemplary embodiment of the present disclosure, the generating of the projection image may include generating an image of a side-rear region in a direction of a passenger seat, and the setting of the projection position may include setting the projection position to be closer to a side mirror of the vehicle within the windshield in proportion to the speed of the vehicle when the speed of the vehicle is equal to or greater than the threshold speed.

In an exemplary embodiment of the present disclosure, the setting of the projection position where the projection image is displayed based on the vehicle speed information may include setting a projection distance between both eyes of the user and the projection image to be longer as the speed of the vehicle increases.

In an exemplary embodiment of the present disclosure, the setting of the projection position where the projection image is displayed based on the vehicle speed information may include determining the projection position so that a shortest distance between the projection position and a virtual straight line for connecting both eyes of the user and a side mirror of the vehicle to each other is within a threshold distance in response that the speed of the vehicle is lower than the threshold speed.

In an exemplary embodiment of the present disclosure, the setting of the projection position where the projection image is displayed based on the vehicle speed information may include determining the projection position in a fixed region not opened or closed in a side window of the vehicle.

In an exemplary embodiment of the present disclosure, the generating of the projection image may include generating a first projection image based on a left side-rear region image and generating a second projection image based on a right side-rear region image, and the displaying of the projection image at the projection position may include displaying the first projection image on a left side mirror, and displaying the second projection image on a right side mirror so that projection distances of the first projection image and the second projection image are equal to each other.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
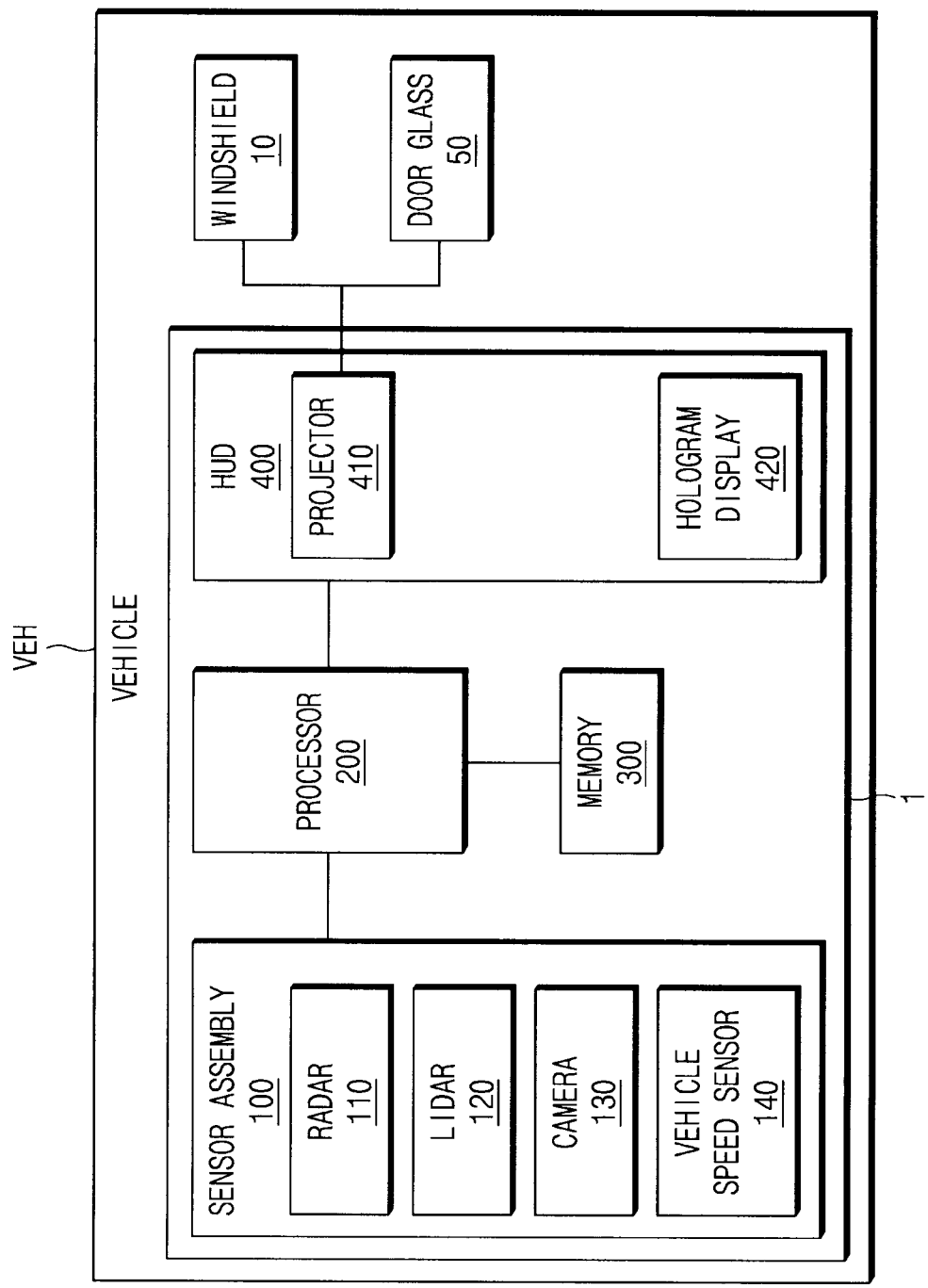
FIG. 1 is a block diagram showing a configuration of a side view display device according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present disclosure, a detailed description of the related known configuration or function will be omitted when it is determined that it interferes with the understanding of the exemplary embodiment of the present disclosure.

In describing the components of the exemplary embodiment of the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein include the same meaning as commonly understood by one of ordinary skill in the art to which the present disclosure belongs. It will be further understood that terms, such as those defined in commonly used dictionaries, should be interpreted as having a meaning which is consistent with their meaning in the context of the relevant art and will not be interpreted in an idealized or overly formal sense unless expressly so defined herein.

Hereinafter, various embodiments of the present disclosure will be described in detail with reference to FIGS. 1 to 23.

FIG. 1 is a block diagram showing a configuration of a side view display device according to an exemplary embodiment of the present disclosure. A side view display device 1 shown in FIG. 1 may be implemented inside a vehicle. The side view display device 1 may be integrally formed with internal control units of the vehicle, or may be implemented as a separate device and connected to the control units of the vehicle by separate connection means.

The side view display device 1 according to the exemplary embodiment of the present disclosure may include a sensor assembly 100, a processor 200, a memory 300, and a head up display (HUD) 400.

The sensor assembly 100 is for obtaining external information of the vehicle and vehicle speed information of the vehicle. The sensor assembly 100 may include a radar 110, a Light Detection and Ranging (LiDAR) 120, a camera 130, and a vehicle speed sensor 140.

The radar 110 may transmit a directional transmission signal and receive a reflected wave of the transmission signal as a reception signal. The radar 110 may be configured to determine an object based on a frequency difference between the transmission signal and the reception signal.

The LiDAR 120 may be configured to determine the object by transmitting a laser pulse and measuring a time at which the emitted laser pulse is reflected. The LiDAR 120 may provide 3D information.

The camera 130 may obtain a surrounding region image of the vehicle based on an electrical signal obtained via an image sensor. The surrounding region image may be a side-rear region image of the vehicle. The camera 130 may include a first camera configured for obtaining a left side-rear region image of the vehicle and a second camera configured for obtaining a right side-rear region image of the vehicle.

The camera 130 may be at least one of a mono camera, a stereo camera, and an around view monitoring (AVM) camera.

The vehicle speed sensor 140 is for obtaining the vehicle speed information of the vehicle. A reed switch type vehicle speed sensor, a photoelectric vehicle speed sensor, an electronic vehicle speed sensor, a voltage detection type vehicle speed sensor, a cycle detection type vehicle speed sensor, or the like may be used as the vehicle speed sensor 140.

The processor 200 may be configured to generate a projection image to be displayed to a user based on the surrounding region image obtained by the camera 130. The processor 200 may set a projection position where the projection image is displayed based on the vehicle speed information.

The processor 200 may be configured to generate a first projection image based on the left side-rear region image obtained by the first camera, and generate a second projection image based on the right side-rear region image obtained by the second camera.

Furthermore, the processor 200 may extract objects from the surrounding region image, and extract an object of interest, such as a vehicle, a pedestrian, or the like, among the objects. The processor 200 may be configured to generate the projection image after removing the objects other than the object of interest extracted from the surrounding region image.

The processor 200 may perform artificial intelligence learning to extract the object of interest. To the present end, the processor 200 may include an artificial intelligence (hereinafter, referred to as AI) processor. The AI processor may learn a neural network using a pre-stored program. A neural network for object recognition may be designed to simulate a human brain structure on a computer, and may include a plurality of network nodes including weights that simulate neurons of a human neural network. The plurality of network nodes may transmit and receive data with each other based on connection relationships thereof to simulate a synaptic activity of the neurons that transmit and receive signals with each other via synapses. The neural network may include a deep learning model developed from a neural network model. In the deep learning model, the plurality of network nodes may transmit and receive the data with each other based on convolution connection relationships while being located in different layers. Examples of the neural network models may include various deep learning techniques such as a deep neural network (DNN), a convolutional deep neural network (CNN), a recurrent Boltzmann machine (RNN), a restricted Boltzmann machine (RBM), a deep belief network (DBN), and a deep Q-network.

A more specific operation of the processor 200 will be described later.

The memory 300 may store an algorithm for recognizing the object, and may temporarily store the surrounding region image and the vehicle speed information obtained by the sensor assembly 100. The memory 300 may be included in the processor 200 or may be a separate memory. Therefore, the memory 300 may be a hard disk drive, a flash memory, an electrically erasable programmable read-only memory (EEPROM), a static RAM (SRAM), a ferro-electric RAM (FRAM), a phase-change RAM (PRAM), a magnetic RAM (MRAM), a dynamic random access memory (DRAM), a synchronous dynamic random access memory (SDRAM), a double date rate-SDRAM (DDR-SDRAM), and the like.

The head up display 400 is for displaying the first projection image and the second projection image generated by the processor 200 to the user. A projector 410 or a hologram display 420 may be used as the head up display 400.

The projector 410 may display the first projection image or the second projection image generated by the processor 200 on a windshield 10 or a door glass 50.

The hologram display 420 is for displaying the first projection image or the second projection image generated by the processor 200 to the user. A hologram lens coupled to the windshield 10 or the door glass 50 may be used for the hologram display 420.

Figure 2:
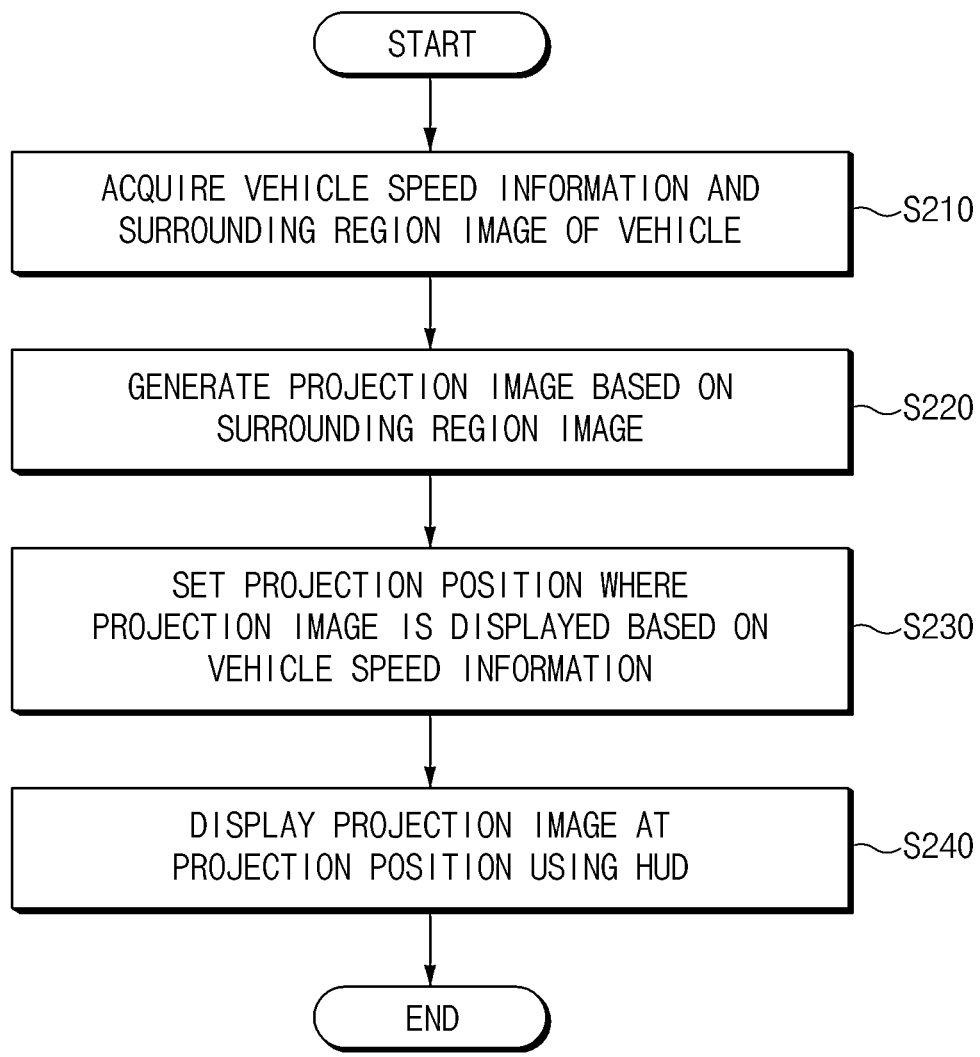
FIG. 2 is a flowchart illustrating a method for controlling a side view display device according to an exemplary embodiment of the present disclosure.

FIG. 2 is a flowchart illustrating a method for controlling a side view display device according to an exemplary embodiment of the present disclosure.

Referring to FIG. 2, the method for controlling the side view display device according to an exemplary embodiment of the present disclosure is as follows.

In S210, the sensor assembly 100 may obtain the vehicle speed information and the surrounding region image of the vehicle.

The camera 130 may obtain the left side-rear region image and the right side-rear region image.

The vehicle speed sensor 140 may obtain the vehicle speed information of the vehicle.

In S220, the processor 200 may be configured to generate the projection image based on the surrounding region image.

The processor 200 may be configured to generate the first projection image based on the left side-rear region image, and may be configured to generate the second projection image based on the right side-rear region image.

Figure 3:
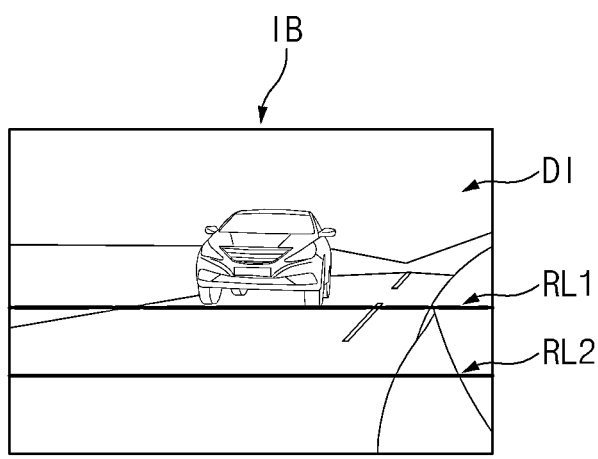
FIG. 3 is a diagram showing an example of a projection image generated by a processor.

FIG. 3 is a diagram showing an example of the projection image generated by the processor 200.

Referring to FIG. 3, the processor 200 may be configured to generate an image box IB that determines a size of the projection image. Furthermore, the processor 200 may detect the object in the surrounding region image, and generate a projection image DI in which the detected object is displayed in the image box IB.

Furthermore, the processor 200 may display the object at a different position in the image box IB based on a distance of the detected object. To the present end, the projection image may include one or more reference lines RL1 and RL2. The reference lines RL1 and RL2 may be marks indicating how far the object is spaced from the vehicle. For example, the first reference line RL1 is a mark indicating that the object is 50 m away from the vehicle, and the second reference line RL2 may be a mark indicating that the object is 10 m away from the vehicle.

In S230, the processor 200 may set the projection position where the projection image is displayed based on the vehicle speed information.

The projection position may be the windshield 10 located at a front portion of the vehicle or the door glass 50 located at a side surface of the vehicle. For example, the processor 200 may select the left door glass 50 as the projection position of the first projection image, and select the right door glass 50 as the projection position of the second projection image.

Furthermore, the processor 200 may set the projection position differently based on a speed of the vehicle. A detailed embodiment of the content described above will be described later.

In S240, the head up display 400 may display the projection image at the projection position under control of the processor 200.

Figure 4:
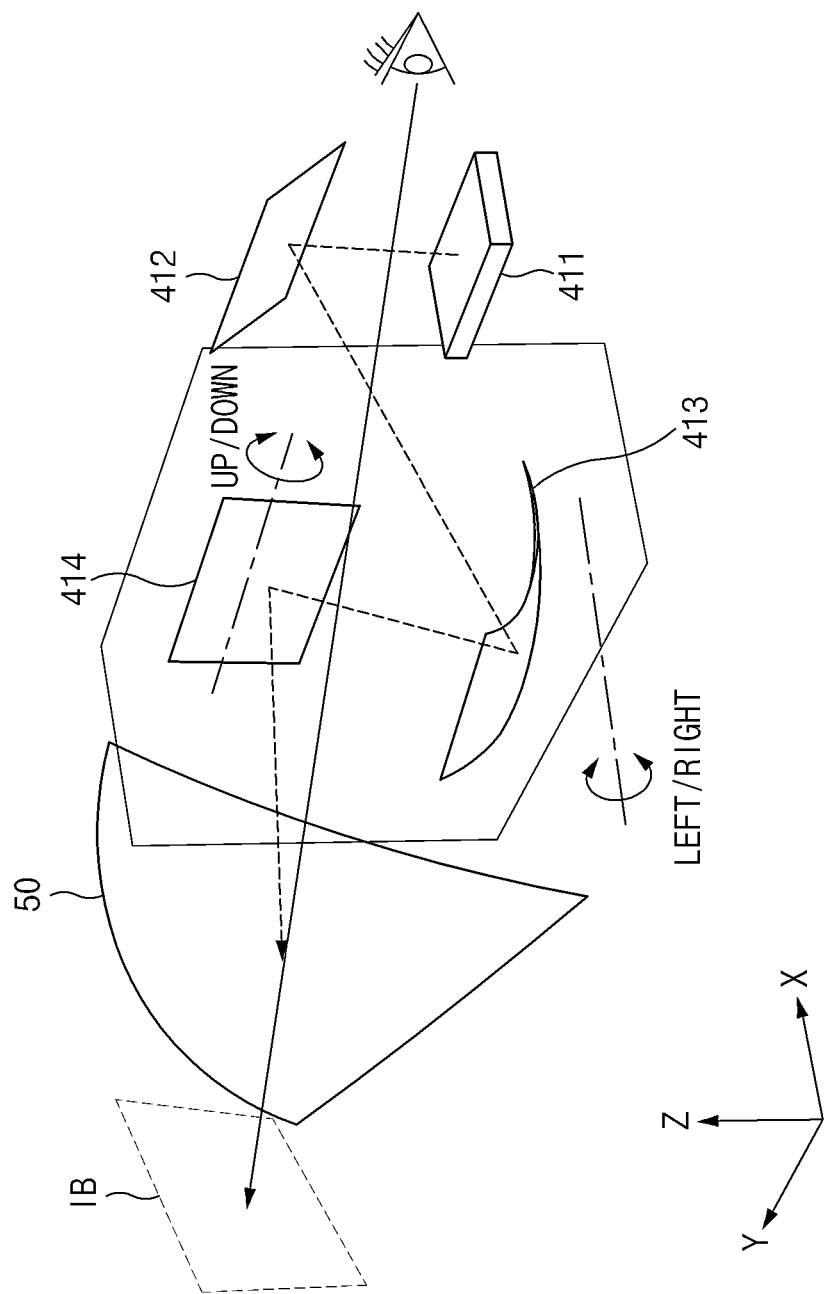
FIG. 4 and FIG. 5 are schematic diagrams showing a structure of a projector.
Figure 5:
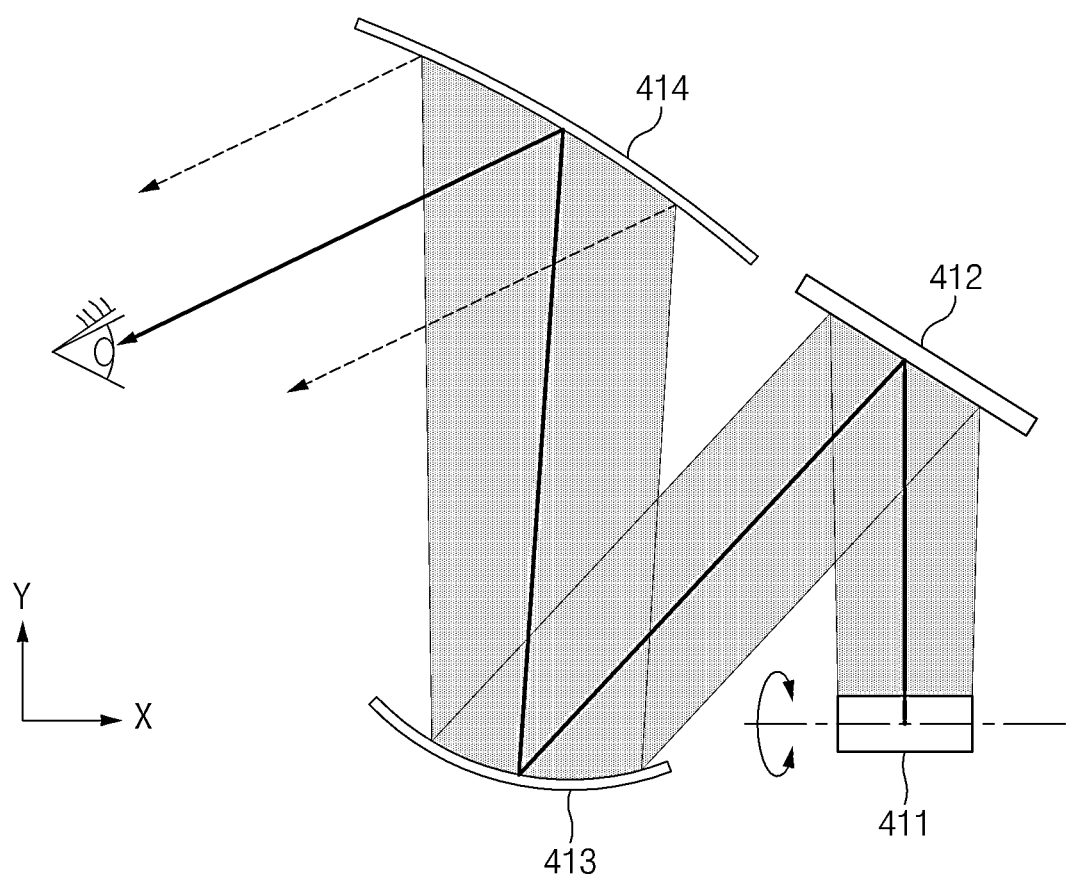
Figure 6:
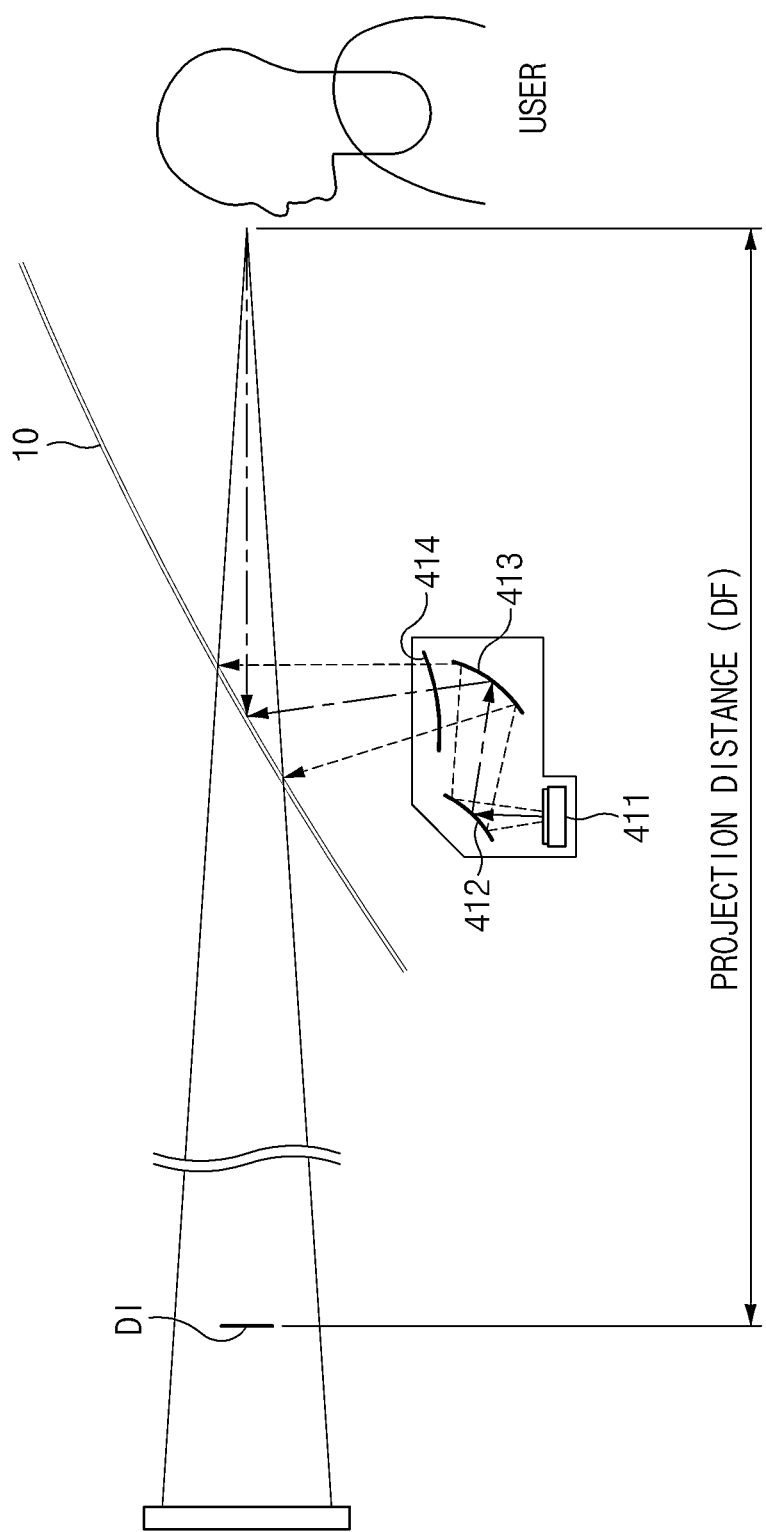
FIG. 6 is a schematic diagram showing displaying a projection image on a windshield using a projector.

FIG. 4, FIG. 5 and FIG. 6 are diagrams showing an exemplary embodiment of a head up display implemented as a projector. FIG. 4 is a diagram showing an exemplary embodiment of displaying the projection image with the door glass, and FIG. 6 is a diagram showing an exemplary embodiment of displaying the projection image with the windshield.

FIG. 4 and FIG. 5 are schematic diagrams showing a structure of a projector, and FIG. 6 is a schematic diagram showing displaying a projection image on a windshield using a projector. In coordinate axes shown in FIG. 4 and FIG. 5, an x-axis may mean an axis perpendicular to a forward direction of the vehicle in a bird's eye view. A y-axis may mean the forward direction of the vehicle, and a z-axis may mean a direction perpendicular to a xy plane. Accordingly, the door glass shown in FIG. 4 may be a door glass of a left door.

Referring to FIG. 4 and FIG. 5, the projector 410 according to an exemplary embodiment of the present disclosure may include an output device 411 and first, second, and third mirrors 412, 413, and 414.

The output device 411 may transmit the projection image generated by the processor 200 in a direction of the first mirror 412.

The projection image transmitted from the output device 411 may be sequentially reflected from the first mirror 412, the second mirror 413, and the third mirror 414, and displayed on a region of the door glass 50.

The first mirror 412 may be a flat mirror disposed between the output device 411 and the second mirror 413.

The second mirror 413 may be a concave mirror and may rotate around the x-axis. As the second mirror 413 rotates, the projection position may move in a direction of the y-axis. That is, based on the rotation of the second mirror 413, the projection position may move in a left and right direction when viewed by the user.

The third mirror 414 may be the flat mirror and rotate around the y-axis. As the third mirror 414 rotates, the projection position may move in a direction of the z-axis. That is, based on the rotation of the third mirror 414, the projection position may move in a vertical direction.

The projector 410 according to an exemplary embodiment of the present disclosure may display the projection image on the region of the windshield 10 as shown in FIG. 6.

The processor 200 may display the projection image on the windshield 10 when the speed of the vehicle is equal to or greater than a preset threshold speed. When the speed of the vehicle is high, it is desirable for the user to look forward thereof. Therefore, the processor 200 may set the projection position to the windshield 10 to prevent a user's gaze from being dispersed when the speed of the vehicle is equal to or greater than the threshold speed.

Furthermore, a projection distance DF of the projection image DI displayed on the windshield 10 may vary depending on the speed. The projection distance DF may mean a distance between both eyes of a user and the projection image DI.

The processor 200 may set the projection distance DF longer as the speed of the vehicle increases. The reason for adjusting the projection distance DF based on the speed is to minimize a change in the eyes based on a focal length. As the speed increases, the user looks far away, so that the focal length of the user's eyes is great. Therefore, when the projection distance DF is short at the high vehicle speed, it may take a long time for the user's eyes to adjust the focal length when looking at the projection image DI while looking at an actual image. The processor 200 may set the projection distance DF longer as the speed of the vehicle increases, so that the user's eyes may rapidly adapt at a moment when the user alternately looks at the actual object and the projection image.

Figure 7:
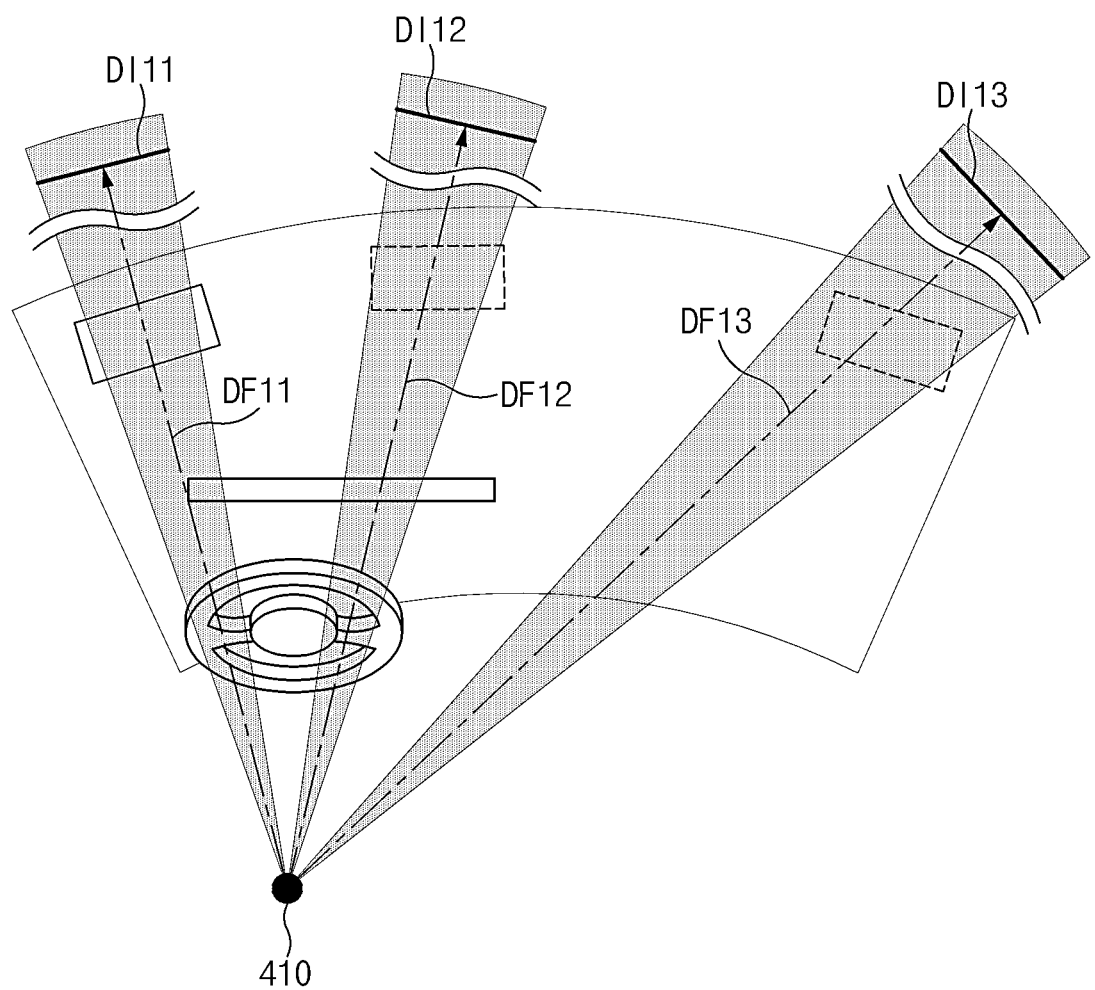
FIG. 7 is a diagram illustrating an exemplary embodiment of setting a projection position on a windshield.

FIG. 7 is a diagram illustrating an exemplary embodiment of setting a projection position on a windshield. In the exemplary embodiment shown in FIG. 7, a type of head up display may not be limited.

Referring to FIG. 7, the processor 200 may differently set the projection position within the windshield based on the vehicle speed. The processor 200 may display a projection image "DI13" so that the projection position is closer to a side mirror as the vehicle speed increases. The setting of the projection position closer to the side mirror as the vehicle speed increases may be in consideration of a driving habit of the user who used the conventional side mirror.

Alternatively, when the vehicle speed is high, to reduce an angle at which the user turns a head thereof, a projection image "DI11" or a projection image "DI12" may be displayed so that the projection position is closer to the front.

As a result, the processor 200 may set the projection position in consideration of the user's habit or the head turn angle. Such criteria may be set by the user because such criteria may lead to conflicting results for the same vehicle speed.

Figure 8:
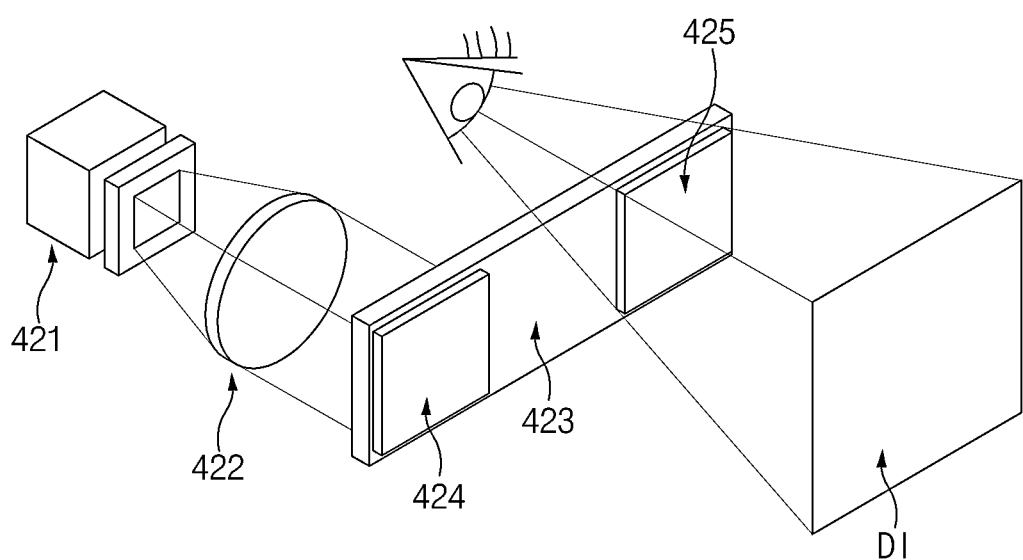
FIG. 8 and FIG. 9 are diagrams showing an exemplary embodiment of a hologram display according to an exemplary embodiment of the present disclosure.
Figure 9:
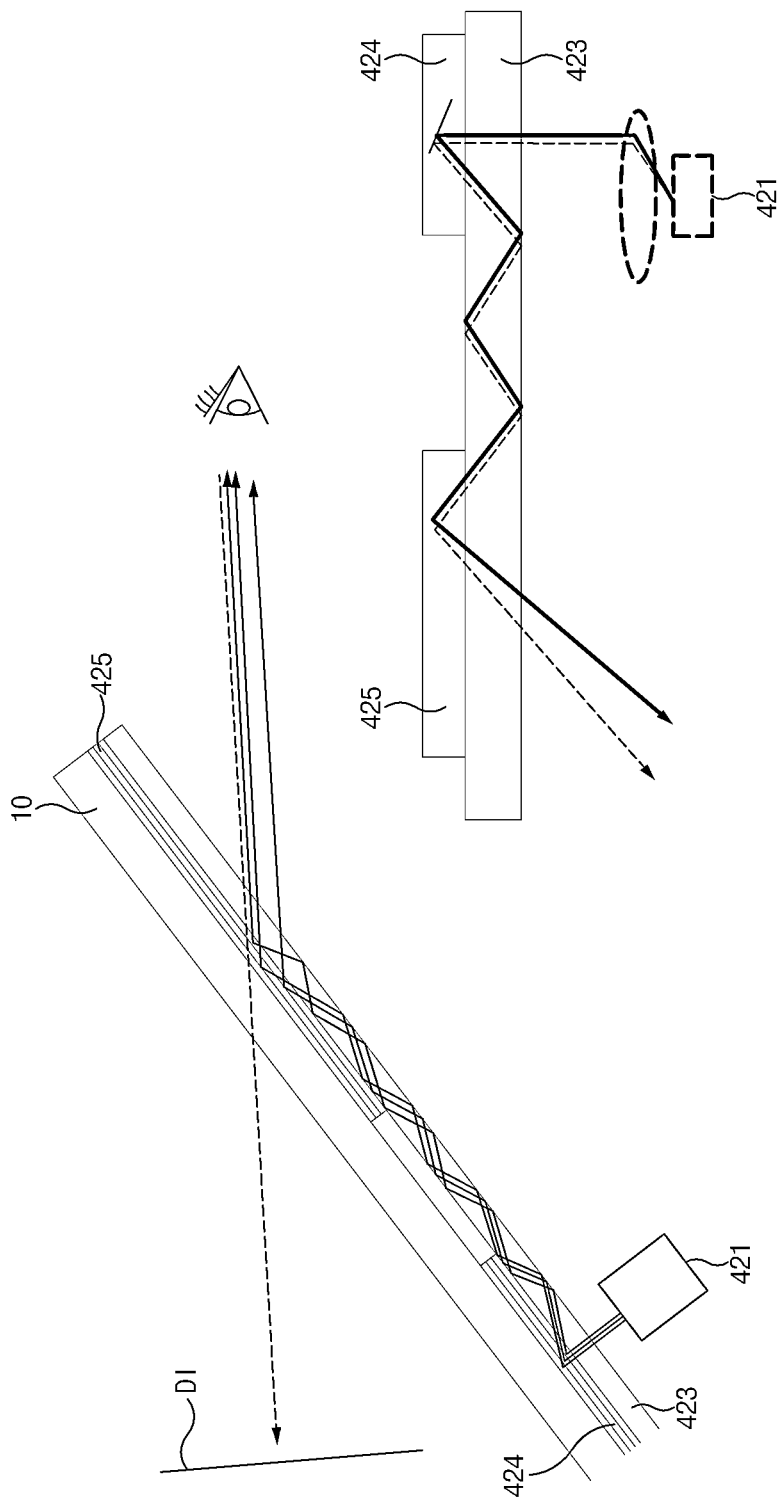

FIG. 8 and FIG. 9 are diagrams showing an exemplary embodiment of a hologram display according to an exemplary embodiment of the present disclosure.

Referring to FIG. 8 and FIG. 9, the hologram display according to an exemplary embodiment of the present disclosure may include a projector 421, a lens 422, a guide 423, a first plate 424, and a second plate 425. The projector 421 may display the projection image generated by the processor 200. The projection image that has passed through the lens 422 may be irradiated to the first plate 424 coupled to the guide 423. The first plate 424 may separate the projection image into two images. The projection images separated by the first plate 424 may be irradiated to the second plate 425 via the guide 423. To the present end, the guide 423 may include a waveguide. The two images incident on the second plate 425 may be irradiated at different angles to display a hologram image.

Figure 10:
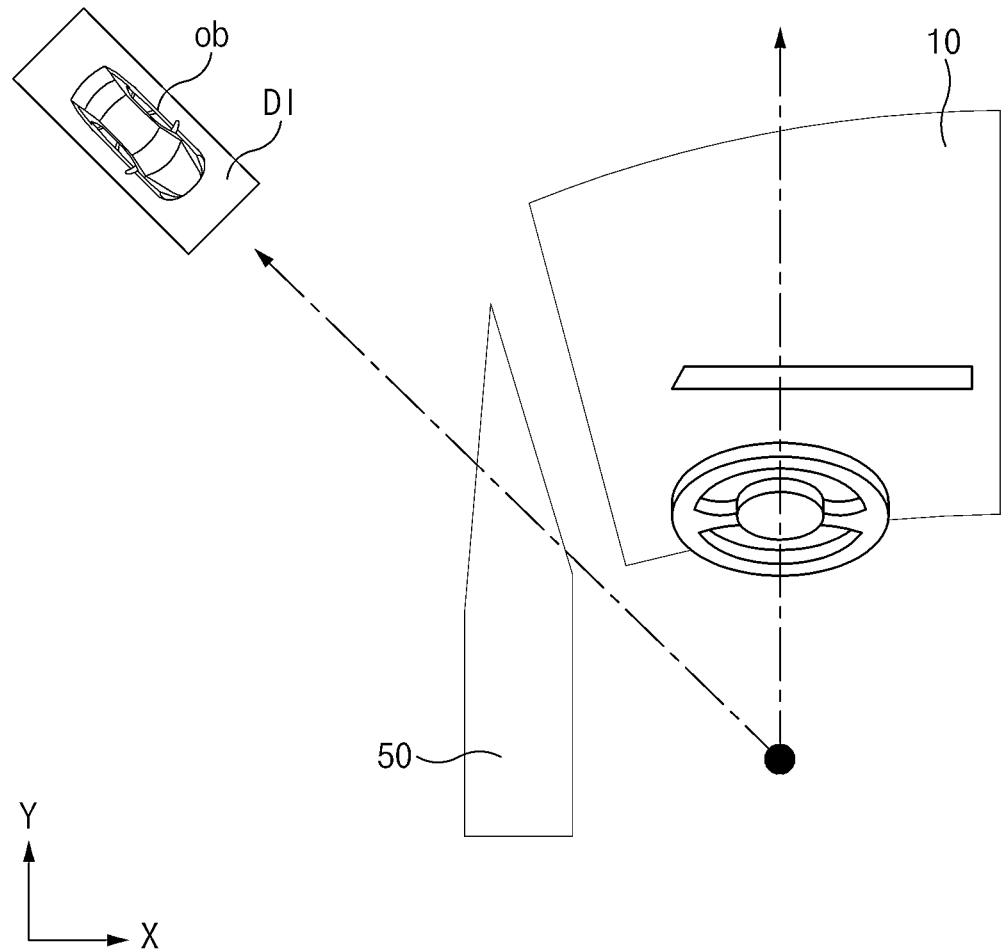
FIG. 10 is a diagram showing an exemplary embodiment of a projection image using a hologram display.

FIG. 10 is a diagram showing an exemplary embodiment of a projection image using a hologram display.

Referring to FIG. 10, the projection image DI using the hologram display may be expressed as a 3D image and have depth. Therefore, an object ob in the projection image DI may be expressed more three-dimensionally.

Figure 11:
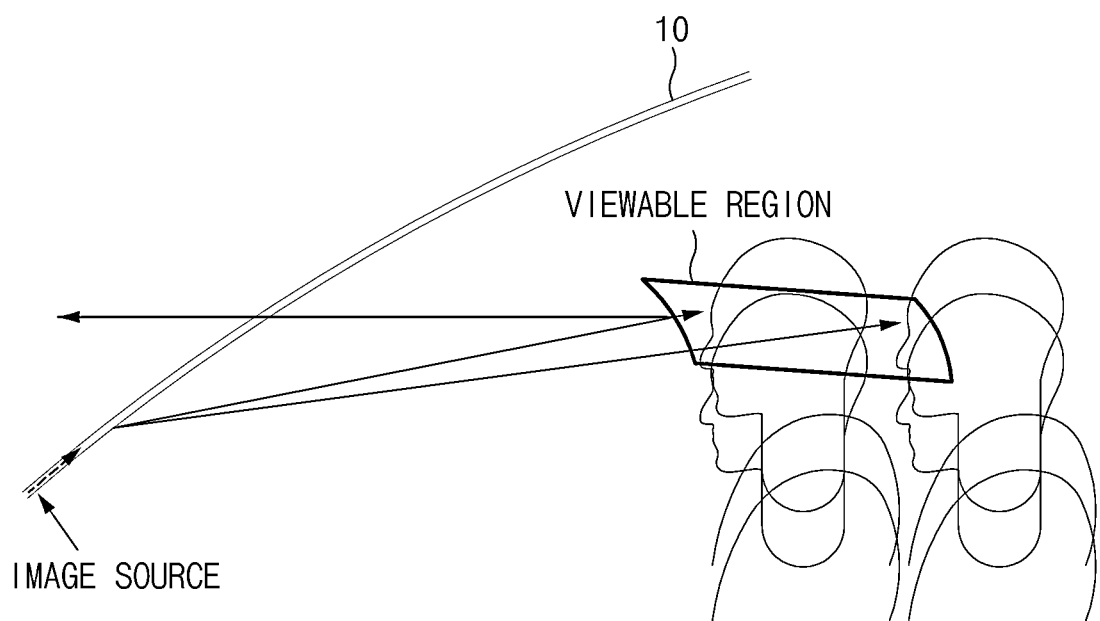
FIG. 11 is a diagram illustrating an irradiation range of a projection image using a hologram display.

FIG. 11 is a diagram illustrating an irradiation range of a projection image using a hologram display.

Referring to FIG. 11, because light irradiated by the hologram display 420 varies based on a viewing position of the user, the projection image may become difficult to recognize when being out of a viewable region of a certain range.

Because positions of the user's both eyes may vary depending on a height of a seat, a height of the user, a position in a front and rear direction of the seat, and the like, the viewable region may be set in consideration of a region where the user's both eyes may be positioned.

Figure 12:
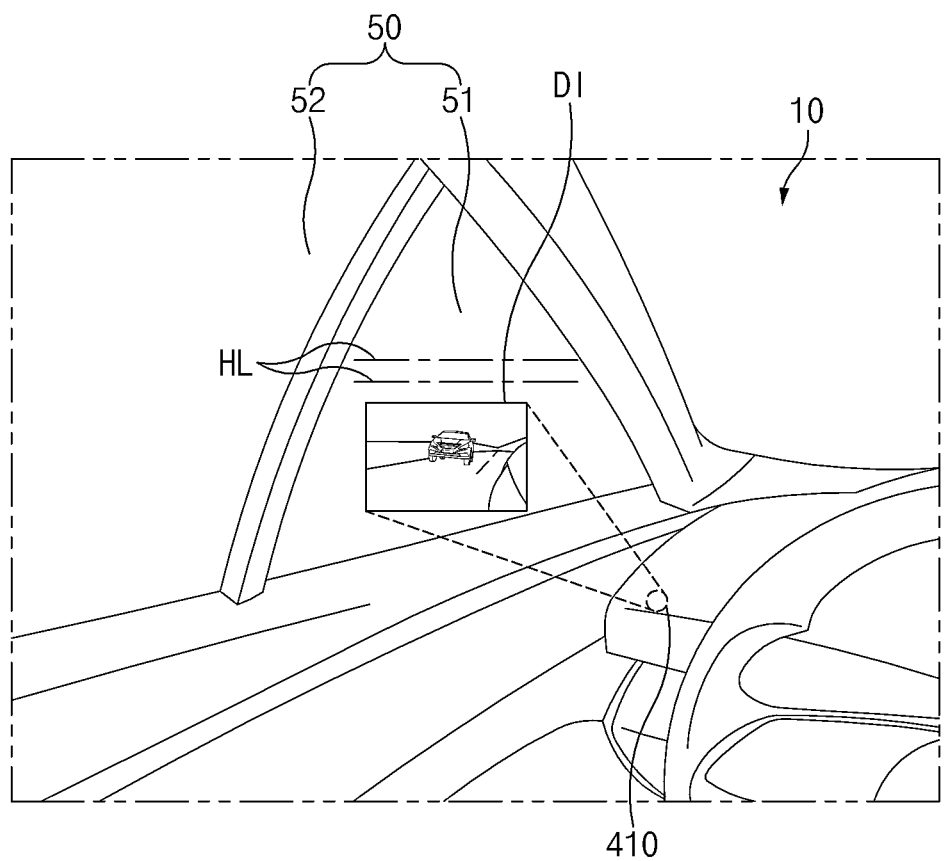
FIG. 12 and FIG. 13 are diagrams illustrating an exemplary embodiment of displaying a projection image on a door glass using a projector.
Figure 13:
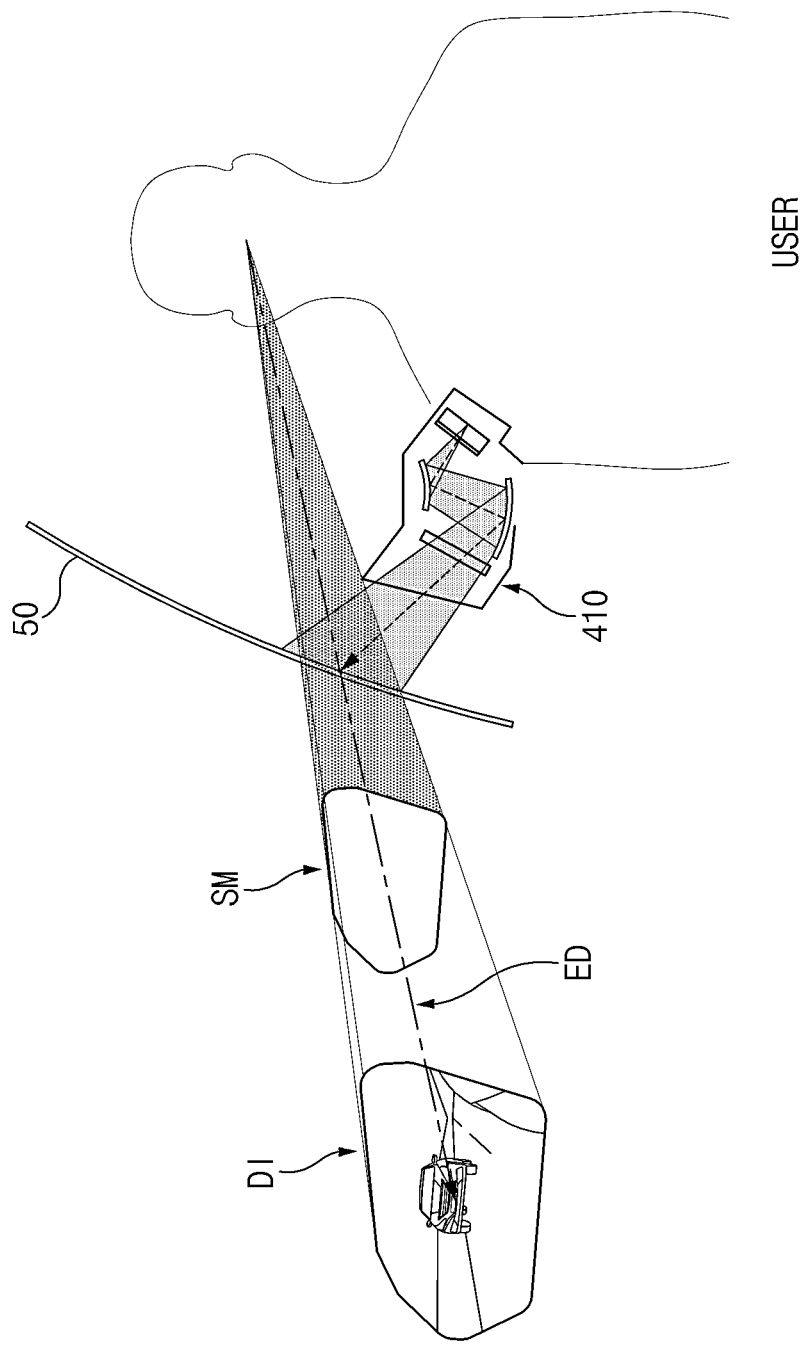

FIG. 12, and FIG. 13 are diagrams illustrating an exemplary embodiment of displaying a projection image on a door glass using a projector.

Referring to FIG. 12, and FIG. 13, the door glass 50 may include a fixed portion 51 and an opening portion 52 for the head up display to be applied. The fixed portion 51 of the door glass 50 may be a region in which a window is not opened, and the opening portion 52 may be a region in which the window may be opened.

The processor 200 may display the projection image DI on the door glass 50 when the speed of the vehicle is lower than the threshold speed. When the projection image DI is displayed on the door glass 50, the projection position may be determined within the fixed portion 51. The processor 200 may be configured to determine the projection position so that the shortest distance between the projection position and a virtual straight line connecting for both of the eyes of the user and a side mirror SM to each other is within a threshold distance. For example, as shown in FIG. 13, the user may determine the projection position so that the projection image DI overlaps the side mirror SM in a gaze direction ED.

In FIG. 13, because a function of the side mirror SM is replaced by the projection image DI irradiated by the projector 410, the side mirror SM may be omitted.

Because the projection image DI is irradiated to the fixed portion 51, the projector 410 may display the projection image DI within the region of the door glass 50 regardless of whether the opening portion 52 is opened for opening of the door glass 50.

Because the projection image DI is also related to driving safety, it is necessary to maintain good visibility. To the present end, the fixed portion 51 may be made of glass including a hot wire HL.

Furthermore, in a curvature of the fixed portion 51, a horizontal curvature and a vertical curvature may be set to be different from each other. Furthermore, because an angle formed by the gaze direction ED of the user and a plane in contact with an arbitrary point of the fixed portion 51 is not a right angle, an image projected on the fixed portion 51 and checked by the user may be distorted from an image irradiated by the projector 410. Accordingly, the processor 200 may be configured to generate the projection image by correcting the surrounding region image in consideration of the curvature of the fixed portion 51 and the gaze direction ED of the user.

Figure 14:
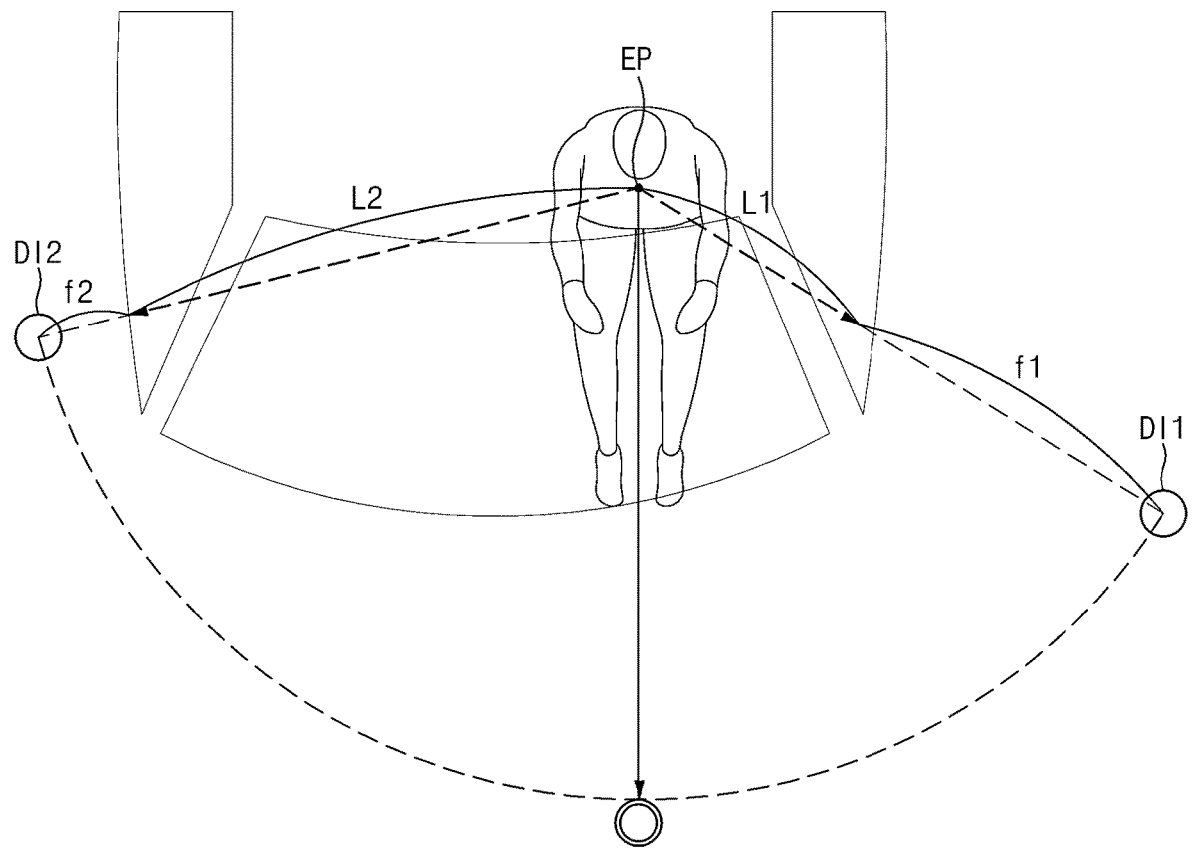
FIG. 14 is a diagram illustrating a projection distance according to Example of the present disclosure.

FIG. 14 is a diagram illustrating a projection distance according to example of the present disclosure. FIG. 14 is a diagram illustrating the projection distance in the exemplary embodiment of displaying the projection image on the door glass using the projector. In a description of FIG. 14, a point where a virtual straight line for connecting an eye reference point EP to an arbitrary point in the first projection image DI meets the left door glass 50 is defined as a first mark point, and a point where a virtual straight line for connecting the eye reference point EP to an arbitrary point in the second projection image DI meets the right door glass 50 is defined as a second mark point. The eye reference point EP may be set to a center portion of both eyes. The first and second mark points may be portions of a region where an image irradiated by the head up display 400 is formed on the door glass 50.

Referring to FIG. 14, in the side view display device according to an exemplary embodiment of the present disclosure, the first projection distance DF1 and the second projection distance DF2 may be set to be equal to each other.

The first projection distance DF1 may be a distance obtained by adding a first distance L1 and a first imaging distance f1. The first distance L1 and a second distance L2 may be distances determined based on a position of the eye reference point EP. The first imaging distance f1 and a second imaging distance f2 may vary based on the projection image irradiated by the head up display 400.

The processor 200 may adjust at least one of the first imaging distance f1 and the second imaging distance f2 to set the first projection distance DF and the second projection distance DF to be equal to each other.

Example shown in FIG. 14 will be described as follows along with Comparative Examples.

Figure 15:
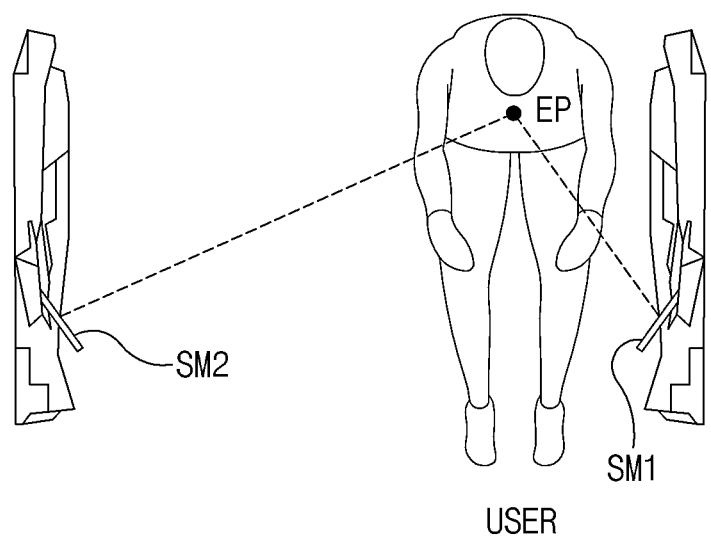
FIG. 15 and FIG. 16 are diagrams for illustrating focal lengths according to Comparative Examples.
Figure 16:
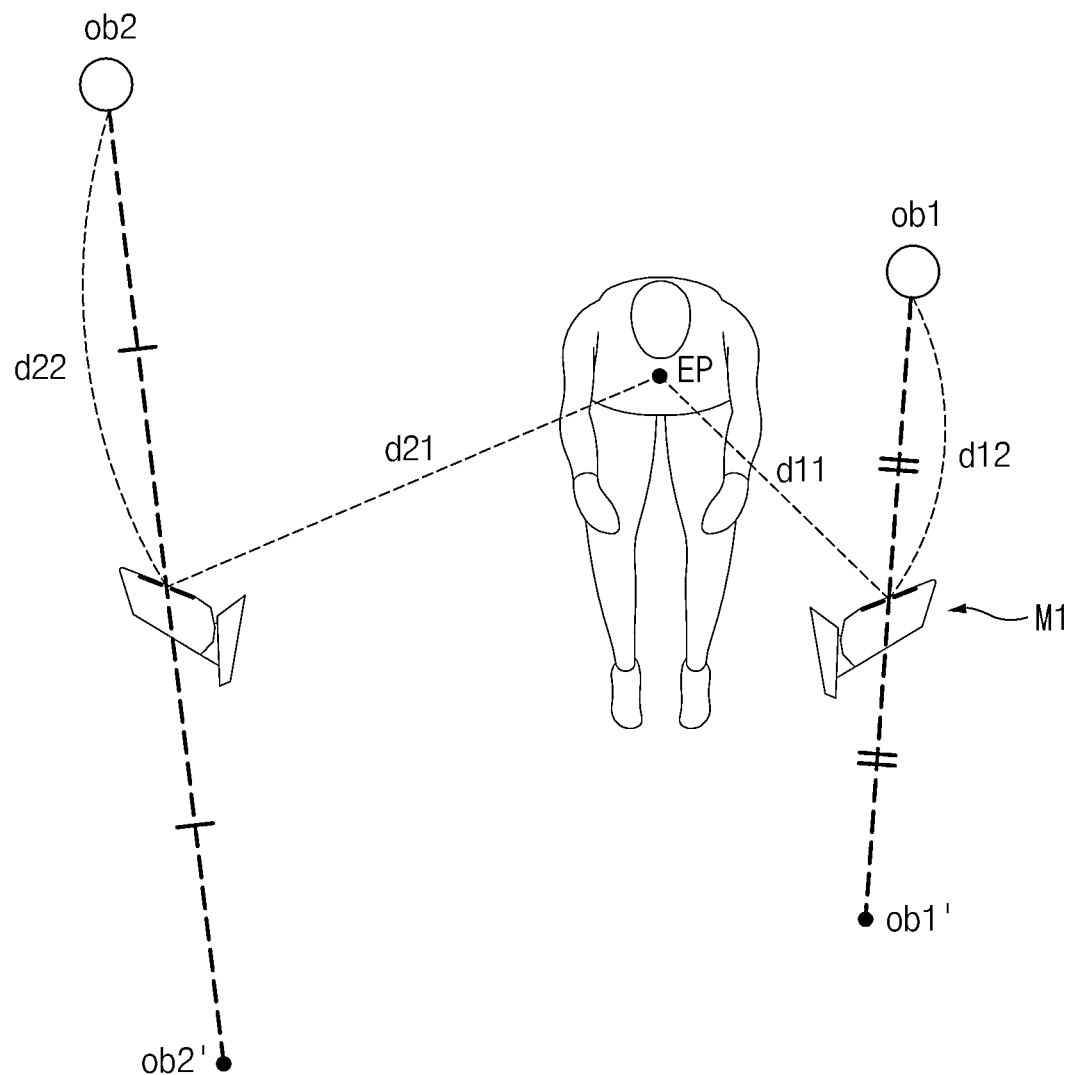

FIG. 15 and FIG. 16 are diagrams for illustrating focal lengths according to Comparative Examples. FIG. 15 is a diagram showing a focal length of a display side monitor, and FIG. 16 is a diagram showing a focal length of a side mirror.

Referring to FIG. 15, a vehicle according to Comparative Example may include a first side monitor SM1 located on a left door and a second side monitor SM2 located on a right door. The first side monitor SM1 based on a liquid crystal display (LCD) or an organic light emitting diode (OLED) display may output an image via a display panel on a front surface thereof. Accordingly, a projection distance between the user USER and the first side monitor SM1 may correspond to a separation distance between the user USER and the first side monitor SM1. Similarly, a projection distance between the user USER and the second side monitor SM2 may correspond to a separation distance between the user USER and the second side monitor SM2.

As a result, the projection distance between the user USER and the first side monitor SM1 and the projection distance between the user USER and the second side monitor SM2 may be different from each other.

Referring to FIG. 16, a vehicle according to another Comparative Example may include a first side mirror M1 configured for checking a left rear region of the user and a second side mirror M2 configured for checking a right rear region of the user.

A distance between a first imaging position ob1' and the first side mirror M1 is equal to a distance d12 between a first object ob1 and the first side mirror M1. An imaging distance of the first object ob1 via the first side mirror M1 is equal to a sum of a distance d11 between the eye reference point EP and the first side mirror M1 and the distance d12 between the first side mirror M1 and the first object ob1.

Similarly, an imaging distance of the second object ob2 via the second side mirror M2 is equal to a sum of a distance d21 between the eye reference point EP and the second side mirror M2 and a distance d22 between the second side mirror M2 and a second object ob2.

Accordingly, the imaging distance when looking at the first side mirror M1 and the second side mirror M2 may vary depending on a position of the first object ob1 or the second object ob2.

As in FIG. 15 and FIG. 16, according to Comparative Examples, because a focus of the eyes of the user when checking a left object and a focus of the eyes when checking a right object are different from each other, it may take time to switch the focus.

In contrast, as shown in FIG. 14, the processor 200 according to an exemplary embodiment of the present disclosure may adjust the first projection distance DF1 and the second projection distance DF2 to be equal to each other, reducing a time for adjusting the focus of the eyes at a moment when a user's viewpoint is switched between the first projection image DI and the second projection image DI.

Figure 17:
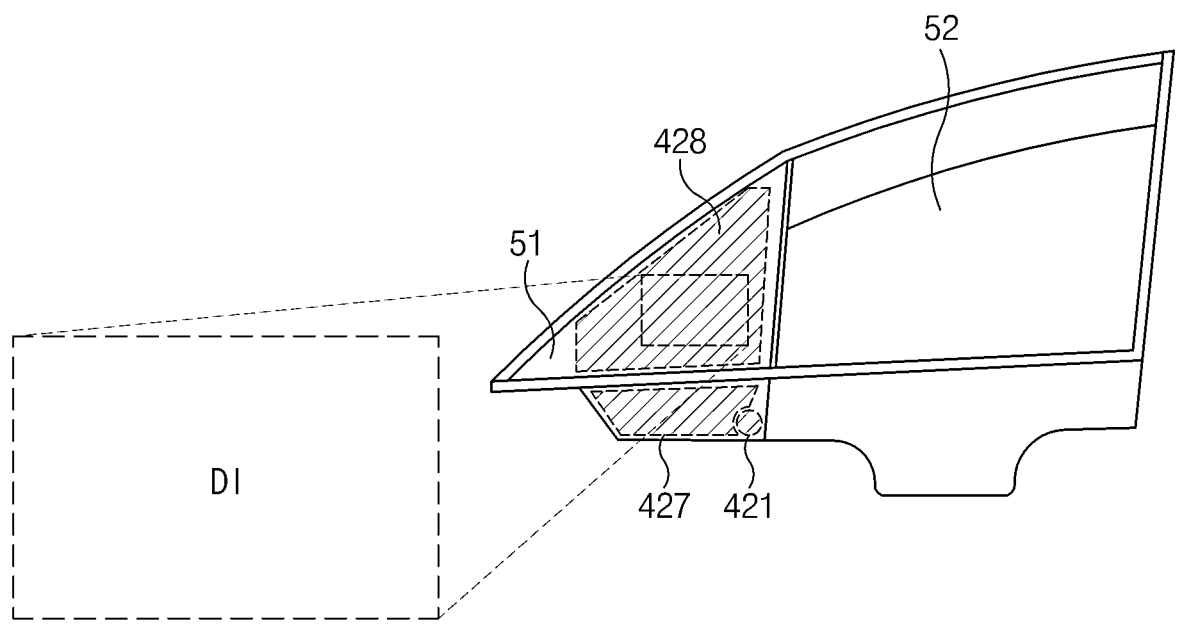
FIG. 17 is a diagram illustrating an exemplary embodiment of displaying a projection image on a door glass using a hologram display.

FIG. 17 is a diagram illustrating an exemplary embodiment of displaying a projection image on a door glass using a hologram display.

Referring to FIG. 17, a hologram display for the door glass may be formed on the fixed portion 51 of the door glass. The hologram display may include the projector 421, a guide panel 427, and a beam splitter assembly 428.

The projector 421 may irradiate the projection image generated by the processor 200.

The guide panel 427 is for guiding a path of the image. The guide panel 427 may provide the image generated by the projector 421 to the beam splitter assembly 428.

The beam splitter assembly 428 may separate the projection image into two or more images using one or a plurality of beam splitters. The projection image DI irradiated via the beam splitter assembly 428 may be expressed as a hologram stereoscopic image.

Figure 18:
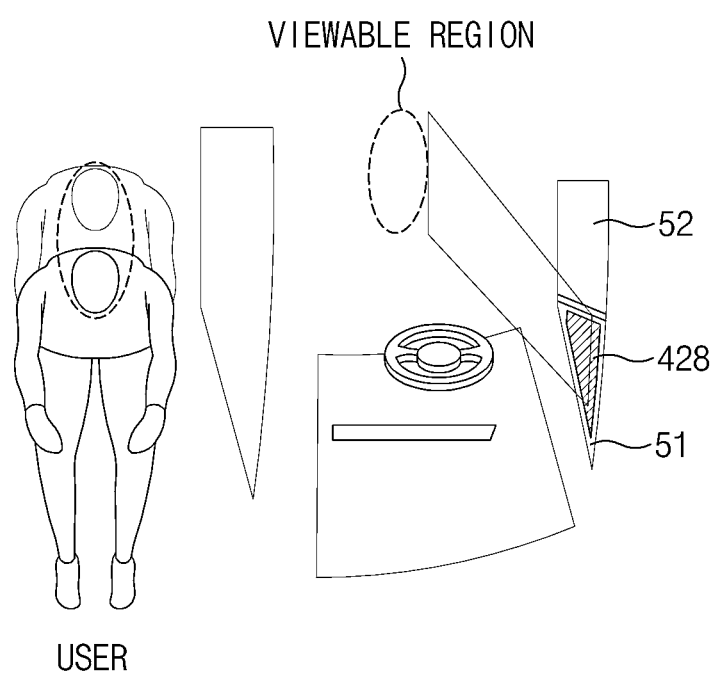
FIG. 18 is a diagram illustrating a viewable region of a hologram display for a door glass.

FIG. 18 is a diagram illustrating a viewable region of a hologram display for a door glass. In FIG. 18, the user USER is represented in a state of being separated from a driver's seat to simplify the drawing, but a following description will be made based on the user USER being accommodated in the driver's seat.

Referring to FIG. 18, the hologram display located on the fixed portion 51 of the door glass may be designed to display the projection image in a direction in which both of the eyes of the user USER are located, which may vary depending on a seating position. That is, the viewable region may be set in consideration of the seating position of the user USER.

An exemplary embodiment of adjusting a position where the hologram display irradiates the projection image in consideration of the seating position of the user USER is as follows.

Figure 19:
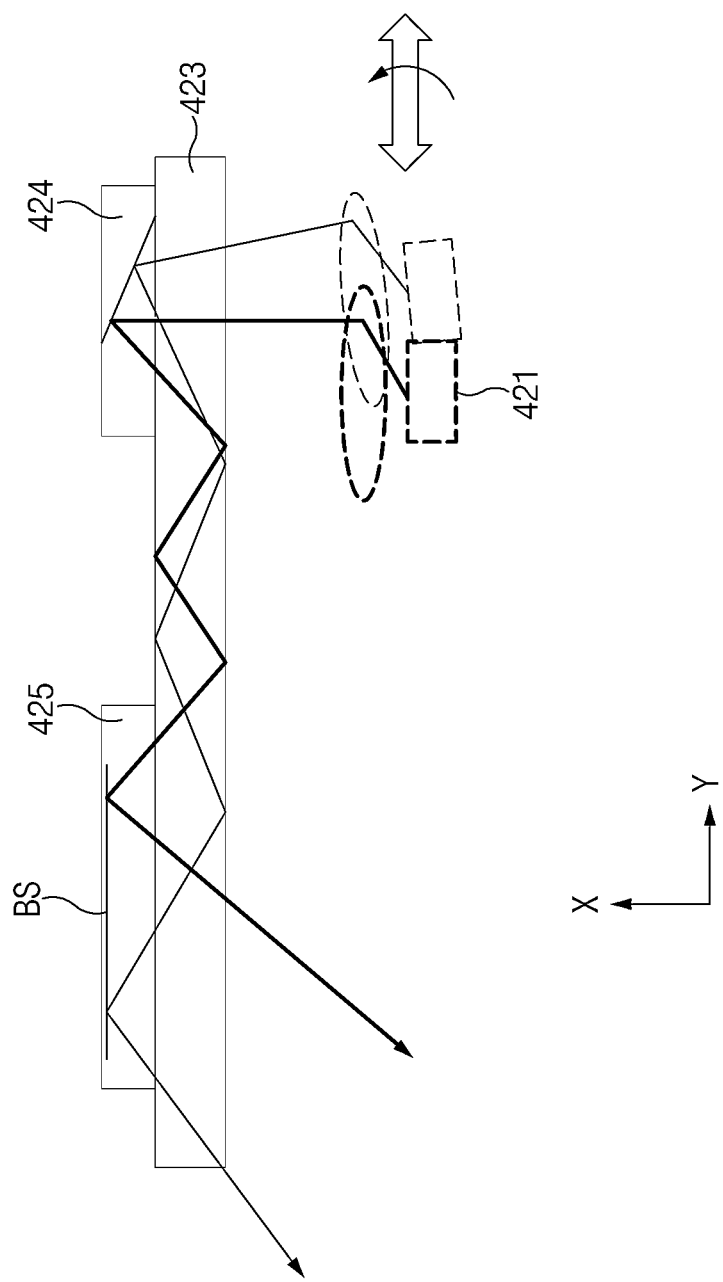
FIG. 19 and FIG. 20 are diagrams illustrating embodiments of adjusting a projection position of a hologram display.
Figure 20:
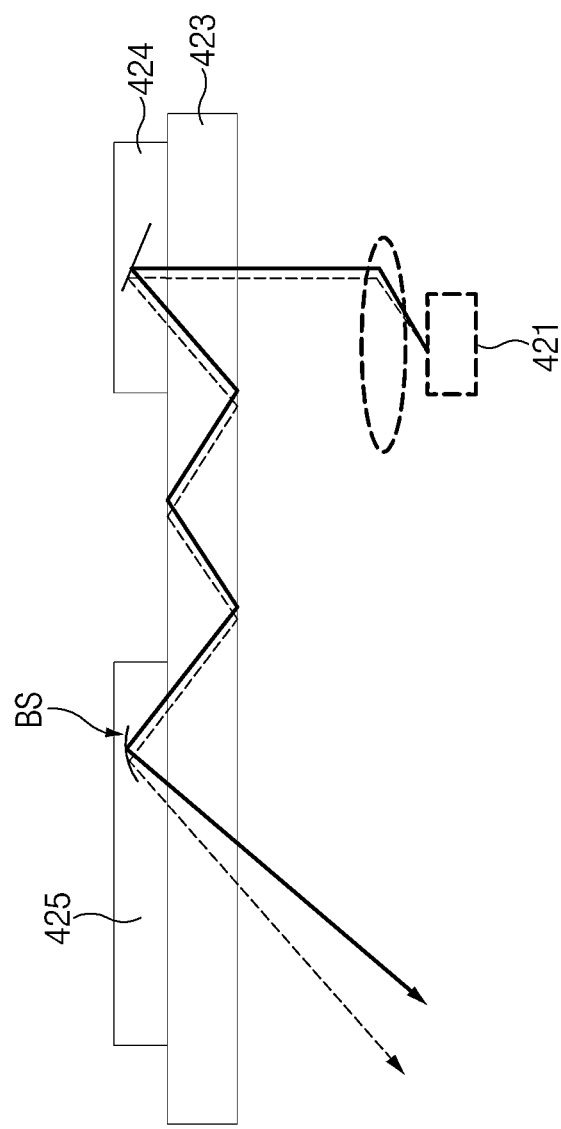

FIG. 19 and FIG. 20 are diagrams illustrating embodiments of adjusting a projection position of a hologram display. FIG. 19 is a diagram showing an exemplary embodiment of adjusting the projection position by adjusting a position of the projector, and FIG. 20 is a diagram showing an exemplary embodiment of adjusting the projection position using the beam splitter. FIG. 19 and FIG. 20 show embodiments of adjusting a projection position based on the hologram display shown in FIG. 8 and FIG. 9.

As shown in FIG. 19, the projector 421 may adjust the projection position in the y-axis direction by moving along the y-axis direction. When an angle of a beam splitter BS formed on the first plate 424 is constant, as the projector 421 moves along the y-axis, an angle of incidence of the projection image incident on the first plate 424 may vary. Accordingly, a path of the projection image incident on the second plate 425 via the first plate 424 may also vary, and an irradiated region of the projection image reflected by the beam splitter BS of the second plate 425 may vary.

Furthermore, by rotating around the y-axis, the projector 421 may adjust the projection position in the direction perpendicular to the xy plane, that is, in the vertical direction in the door glass.

Alternatively, as shown in FIG. 20, the projection position may be adjusted by a reflection angle of the beam splitter BS. The projector 421 may project the two or more projection images to the first plate 424 using a light field display. The plurality of projection images irradiated by the projector 421 may be for projecting the same image to different regions. Because the projection images provided to the first plate 424 are the images projected by the light field display, the projection images may have different angles of incidence. The projection images that have passed through the first plate 424 and the guide panel 423 may be incident to the beam splitter BS of the second plate 425. The beam splitter BS formed on the second plate 425 may be formed in a shape of the concave mirror. Because the projection images are incident to the beam splitter BS at different angles of incidence, the projection images may be reflected at different angles by the beam splitter BS. As a result, the exemplary embodiment shown in FIG. 20 may display the same projection images at the different locations using the light field display and the curved beam splitter BS.

In addition to the exemplary embodiments shown in FIG. 19 and FIG. 20, an output position of the projection image may be adjusted based on a beam splitter using liquid crystals. A degree of deflection of the liquid crystals may vary depending on an electric field.

According to an exemplary embodiment of the present disclosure, the beam splitter may be implemented with the liquid crystals and the electric field may be formed in a region where the beam splitter is disposed. The processor 200 may be configured for controlling a deflection angle of the beam splitter by adjusting the electric field of the region where the beam splitter is placed. That is, the processor 200 may adjust an output range of the projection image reflected by the beam splitter based on the deflection angle of the beam splitter.

Figure 21:
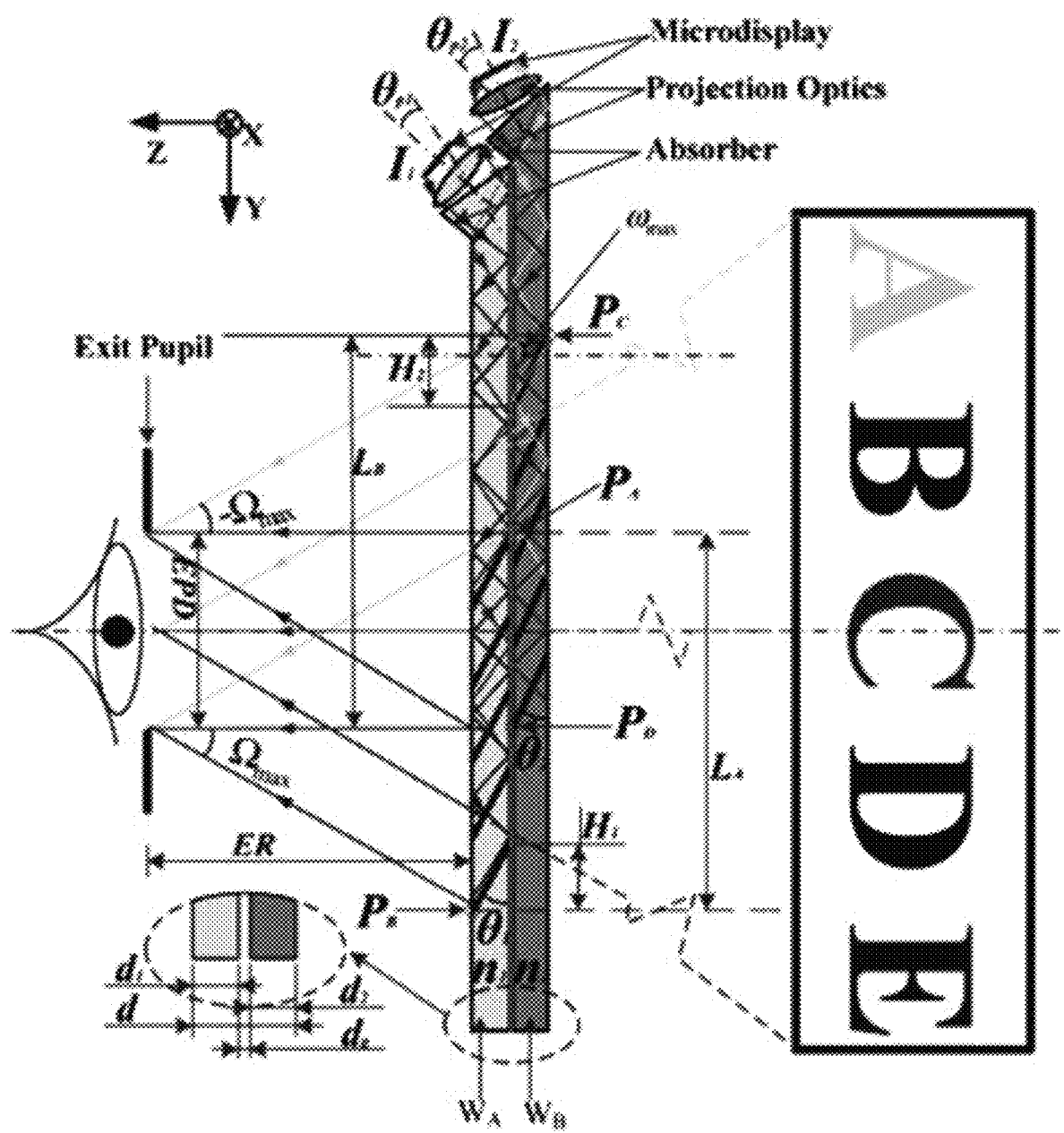
FIG. 21 and FIG. 22 are diagrams illustrating an exemplary embodiment of displaying a projection image at different locations using a plurality of beam splitters.
Figure 22:
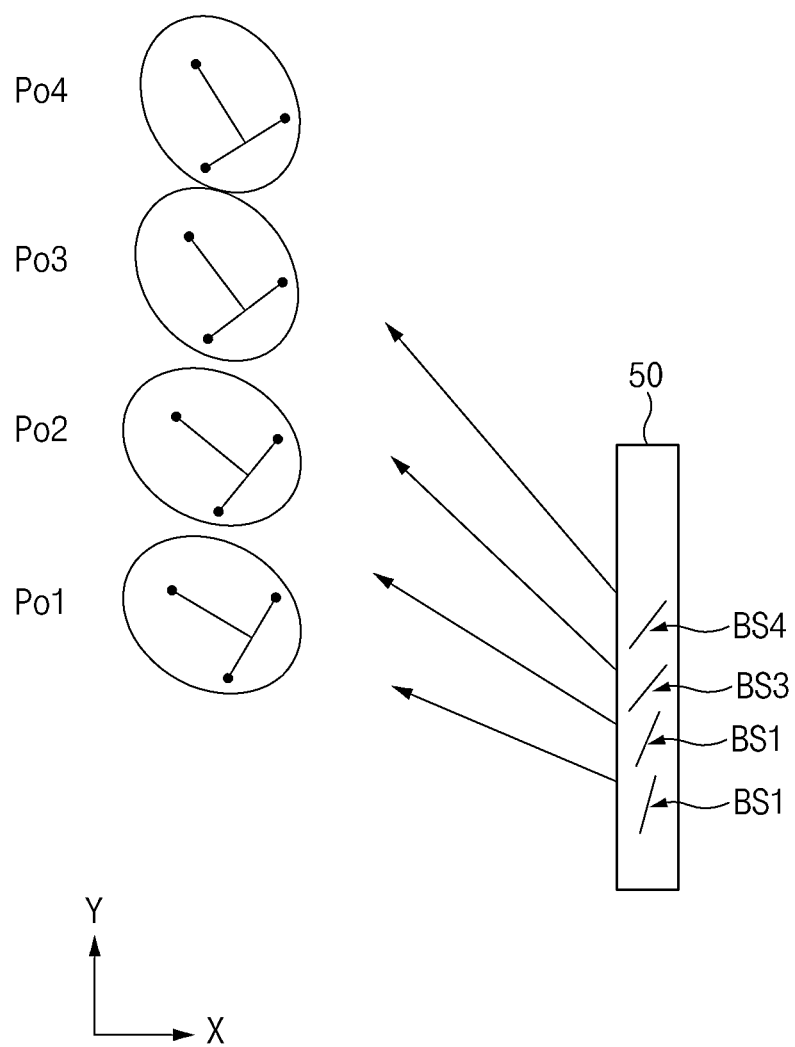

FIGS. 21 and 22 are diagrams illustrating an exemplary embodiment of displaying a projection image at different locations using a plurality of beam splitters.

FIG. 21 shows that light beams that have passed through a microdisplay and a projection optics irradiate different images, for example, images of "A", "B", "C", "D", and "E", by the plurality of beam splitters. A known technique may be used for a detailed light path in FIG. 21.

Referring to FIG. 22, based on the technique of outputting the plurality of images shown in FIG. 21, the images may be output at different locations. For example, the hologram projector formed on the door glass 50 may include a first beam splitter BS1 for providing the projection image to a user at a first position Po1. Similarly, the hologram projector includes a second beam splitter BS2 for providing the projection image to a user at a second position Po2, and a third beam splitter BS3 for providing the projection image to a user at a third position Po3. Furthermore, the hologram projector may include a fourth beam splitter BS4 for providing the projection image to a user at a fourth position Po4.

Figure 23:
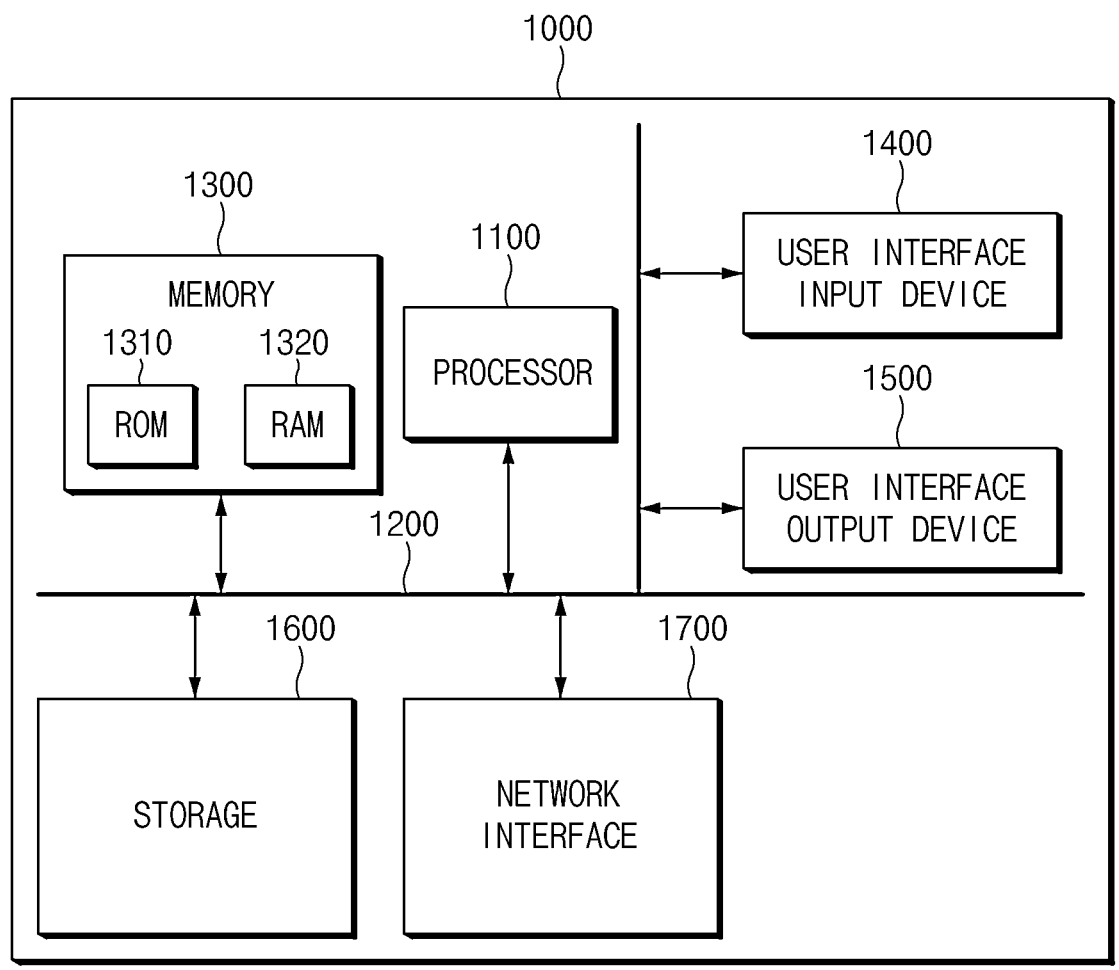
FIG. 23 shows a computing system according to an exemplary embodiment of the present disclosure.

FIG. 23 shows a computing system according to an exemplary embodiment of the present disclosure.

Referring to FIG. 23, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that is configured to perform processing on commands stored in the memory 1300 and/or the storage 1600, and may perform at least some functions of the processor 200 shown in FIG. 1. The memory 1300 and the storage 1600 may include various types of volatile or non-volatile storage media. For example, the memory 1300 may include a Read-Only Memory (ROM) and a Random Access Memory (RAM).

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the exemplary embodiments included in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

According to an exemplary embodiment of the present disclosure, as the head up display is used, the sense of difference in the focal length caused by the side monitor may be reduced.

Furthermore, according to an exemplary embodiment of the present disclosure, because there is no need to add an instrument on the door to display the side view, inconvenience caused to the driver by the additional instrument such as the side monitor may be reduced.

Furthermore, according to an exemplary embodiment of the present disclosure, because the side view may be displayed at a position directed in the same direction as a direction in which the user gazes at the conventional optical mirror using the head up display, the driver may not feel the sense of difference in the gaze.

Furthermore, according to an exemplary embodiment of the present disclosure, because the projection distance is adjusted in response to the change in the driver's focal length depending on the speed of the vehicle, the time required for adjusting the focus of the eyes may be reduced, which may be helpful for safe driving.

Furthermore, various effects identified directly or indirectly through the present specification may be provided.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

A singular expression includes a plural expression unless the context clearly indicates otherwise.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus for displaying a side view of a vehicle, the apparatus comprising:
   a sensor assembly configured for obtaining vehicle speed information of the vehicle and a surrounding region image of the vehicle;
   a processor electrically connected to the sensor assembly and configured to:
     generate a projection image to be displayed to a user based on the surrounding region image; and
     set a projection position where the projection image is displayed based on the vehicle speed information; and
   a head up display electrically connected to the processor and configured for displaying the projection image at the projection position under control of the processor,
   wherein the processor is further configured to set a projection distance between both eyes of the user and the projection image to be longer as a speed of the vehicle increases.

2. The apparatus of claim 1, wherein the sensor assembly is a camera configured for obtaining an image of a side-rear region of the vehicle.

3. The apparatus of claim 2, wherein the processor is further configured to:
   generate an image box for determining a size of the projection image; and
   differently set a position where an object is displayed in the generated image box based on a distance of the object detected in the surrounding region image.

4. The apparatus of claim 2, wherein the head up display is configured to:
   separate the projection image into a plurality of images using a hologram lens, and
   display a hologram image based on the separated images.

5. The apparatus of claim 2, wherein the processor is further configured to determine the projection position within a windshield of the vehicle in response that the speed of the vehicle is greater than or equal to a threshold speed.

6. The apparatus of claim 5, wherein the processor is further configured to:
   generate the projection image for an image of a side-rear region in a direction of a passenger seat of the vehicle; and
   set the projection position to be closer to a side mirror of the vehicle within the windshield in proportion to the speed of the vehicle in response that the speed of the vehicle is greater than or equal to the threshold speed.

7. The apparatus of claim 5, wherein the processor is further configured to determine the projection position so that a shortest distance between the projection position and a virtual straight line for connecting both eyes of the user and a side mirror of the vehicle to each other is within a threshold distance in response that the speed of the vehicle is lower than the threshold speed.

8. The apparatus of claim 7, wherein the head up display is configured to utilize a hologram lens provided in a fixed region not opened or closed in a side window of the vehicle.

9. The apparatus of claim 7, wherein the head up display includes:
   a first display located on a left side mirror of the vehicle and configured for displaying a first projection image; and
   a second display located on a right side mirror of the vehicle and configured for displaying a second projection image,
   wherein the processor is further configured to display the projection image so that a projection distance of the first projection image and a projection distance of the second projection image are equal to each other.

10. A method for displaying a side view of a vehicle, the method comprising:
    obtaining, by a sensor assembly, vehicle speed information of the vehicle and a surrounding region image of the vehicle;
    generating, by a processor electrically connected to the sensor assembly, a projection image to be displayed to a user based on the surrounding region image;
    setting, by the processor, a projection position where the projection image is displayed based on the vehicle speed information; and
    displaying, by the processor, the projection image at the projection position using a head up display,
    wherein the setting of the projection position where the projection image is displayed based on the vehicle speed information includes:
      setting a projection distance between both eyes of the user and the projection image to be longer as the speed of the vehicle increases.

11. The method of claim 10, wherein the obtaining of the surrounding region image of the vehicle includes:
    obtaining an image of a side-rear region of the vehicle.

12. The method of claim 11, wherein the generating of the projection image includes:

generating an image box for determining a size of the projection image; and differently setting a position where an object is displayed in the generated image box based on a distance of the object detected in the surrounding region image.

13. The method of claim 11, wherein the displaying of the projection image includes:

separating the projection image into a plurality of images using a hologram lens; and displaying a hologram image based on the separated images.

14. The method of claim 11, wherein the setting of the projection position where the projection image is displayed based on the vehicle speed information includes:

determining the projection position within a windshield of the vehicle in response that the speed of the vehicle is greater than or equal to a threshold speed.

15. The method of claim 14, wherein the generating of the projection image includes:

generating an image of a side-rear region in a direction of a passenger seat, wherein the setting of the projection position includes:

setting the projection position to be closer to a side mirror of the vehicle within the windshield in proportion to the speed of the vehicle in response that the speed of the vehicle is greater than or equal to the threshold speed.

16. The method of claim 14, wherein the setting of the projection position where the projection image is displayed based on the vehicle speed information includes:

determining the projection position so that a shortest distance between the projection position and a virtual straight line for connecting both eyes of the user and a side mirror of the vehicle to each other is within a threshold distance in response that the speed of the vehicle is lower than the threshold speed.

17. The method of claim 16, wherein the setting of the projection position where the projection image is displayed based on the vehicle speed information includes:

determining the projection position in a fixed region not opened or closed in a side window of the vehicle.

18. The method of claim 16, wherein the generating of the projection image includes:

generating a first projection image based on a left side-rear region image and generating a second projection image based on a right side-rear region image, wherein the displaying of the projection image at the projection position includes:

displaying the first projection image on a left side mirror; and displaying the second projection image on a right side mirror so that projection distances of the first projection image and the second projection image are equal to each other.

* * * * *